Jan. 15, 1929.

E. R. FELLOWS 1,698,882

METHOD OF GENERATING ACCURATELY FINISHED GEARS

Filed Dec. 28, 1923  2 Sheets-Sheet 1

INVENTOR
Edwin R Fellows by Wright, Brown, Quinby & Hay
att'ys

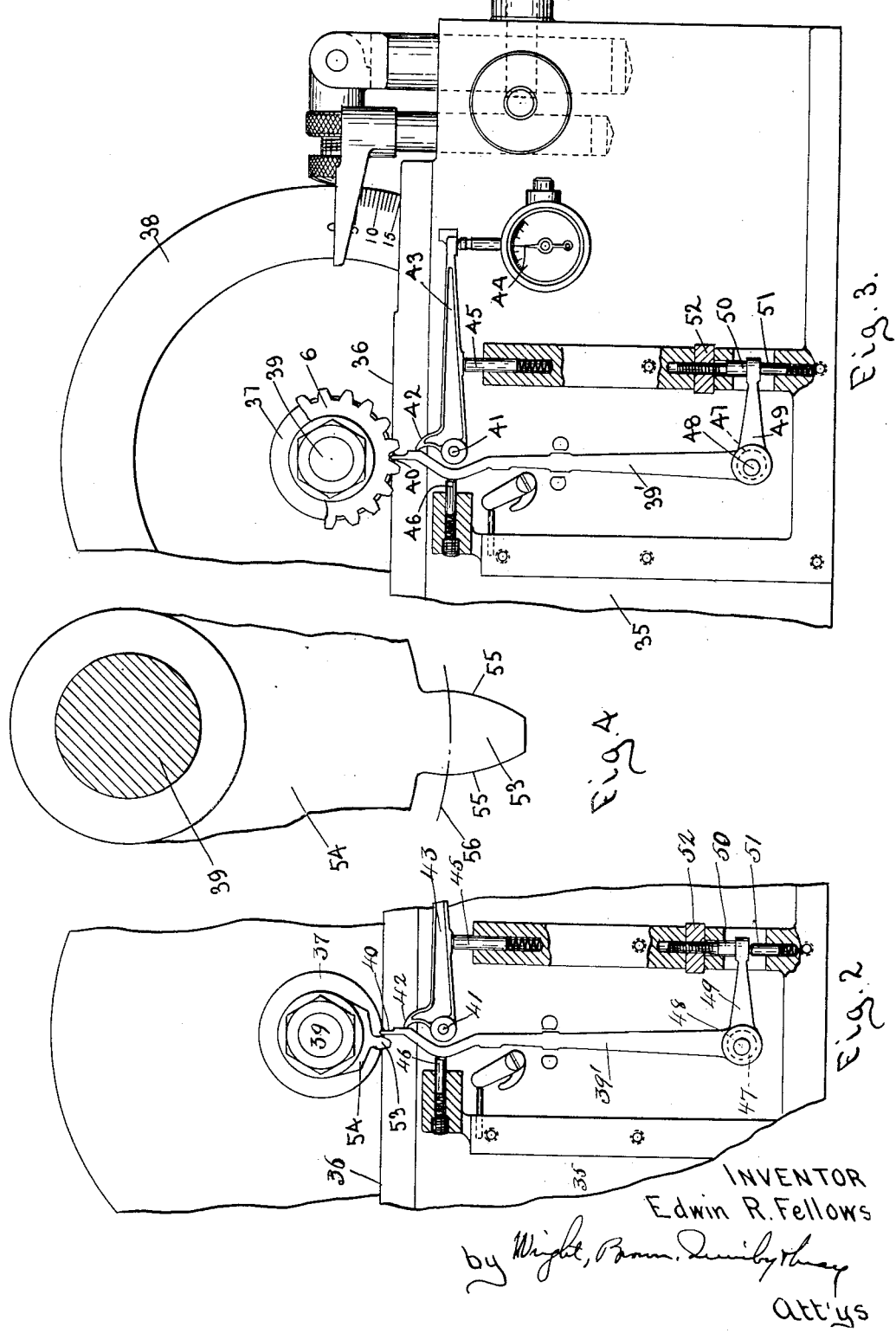

Patented Jan. 15, 1929.

1,698,882

UNITED STATES PATENT OFFICE.

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

METHOD OF GENERATING ACCURATELY-FINISHED GEARS.

Application filed December 28, 1923. Serial No. 683,130.

This invention relates to the art of finishing, or making finished, gears by grinding, or by processes analogous to grinding in respect to the relation which exists between the cutting tool and the work. Its object is to enable gears finished by such processes to be standardized, that is, made in substantially exact conformity with standard forms. Contributary to this ultimate object, is that of detecting and correcting errors which are liable to occur in the grinding of gears, and may be due to inaccurate initial setting up of the grinding machine, or to the wearing away or stretching, or other distortion, of the parts of such machine which control the motions taking place between the work and cutting tool, or to other causes.

In the development of the art of making true hardened gears, for the uses of industry, by grinding, a new problem has arisen which is not encountered in the cutting of gears by other processes; that is the problem of maintaining the gears successively finished in grinding machines, in sufficiently close conformity with the predetermined tooth forms, and particularly in maintaining the correct pressure angle of the gear teeth. In the art of gearing the angle referred to as the pressure angle, or tooth angle, is that which exists between the line of action of a pair of mating gears and the common tangent to the pitch circles of such gears. In order that the mating teeth may make contact with one another on a prescribed line of action throughout their arc of contact they must be correct in form. In the case of an involute gear the faces of the teeth must be involute curves of a particular base circle, which is prescribed by the line of action and the position of the center of the gear. Unless all the gears made to suit certain conditions are produced with their teeth of the proper form, they will not run as smoothly and as quietly as required in the situations for which they are designed.

While sufficiently correct forms may be maintained in gears cut by the shaping process described in my prior patents, and to a certain degree by other methods of cutting with the use of edged metal cutting tools, as well, notwithstanding the effects of sharpening the tools and of wearing of other parts of the machine in use, this is not the case with grinding machines because of the radically different manner in which the cutting tool must act on the work and the fact that wearing or distortion of the means which control the relative motions between the work and the cutter in course of grinding, causes progressively, but imperceptibly, increasing errors in the work. Hence, disregarding possible initial errors in the setting up of a grinding machine, continued use of such machine in grinding gears results in causing gears successively ground to deviate more and more from the desired predetermined form. Such deviation, beyond a certain point, renders the gears unfit for their designed use.

What I have invented and desire to protect by the claims herein, is a method of keeping the gear teeth generated by grinding, within the permissible limits of deviation from the standard forms. In accomplishing this object I make use of a standard or master tooth form and test the gear being ground with reference to such form, noting in what respect, if any, the tooth being ground differs from the master form, and then adjusting the grinding machine in such a manner as will reduce to the minimum the differences existing between the gear tooth in process of finishing and the master form; after which the gear is ground to completion.

In the complete process which I claim, the grinding, or analogous operation is a part, but my claim to this phase of the invention is not restricted to any specific grinding machine or to the function of any such machine, but includes a grinding operation, or one analogous to grinding carried out by any suitable means whatever. Although in general the distinctive tool used in grinding is composed of small particles of extremely hard substances agglomerated with a binder, this fact is not to be taken as limiting my invention to grinding as performed by such a tool only; for within the meaning of the term "grinding" I include any analogous operation which may be performed in a similar way although by specifically different cutting tools.

In the drawings which explain this specification and are referred to in the following description I have shown illustrative forms of apparatus which I may use for carrying out my method, including a standard or master tooth form, a testing instrument for comparing the gear teeth with the master form, and a portion of a grinding machine adapted to generate involute curves in gear teeth and having adjustable means for controlling the relative generating travel between the work and the cutter, adapted to be adjusted so as to control the curvature of the gear tooth faces, and particularly the pressure angle of such gear tooth faces.

Figures 2 and 3 represent the front elevation of such a testing instrument as that above referred to, showing the manner of using such instrument to compare the gear tooth being ground with a master form.

Figure 4 is a fragmentary view of a master form adapted to be used for the purpose of comparison.

Like reference characters designate the same parts wherever they occur in the various figures.

Figure 1:
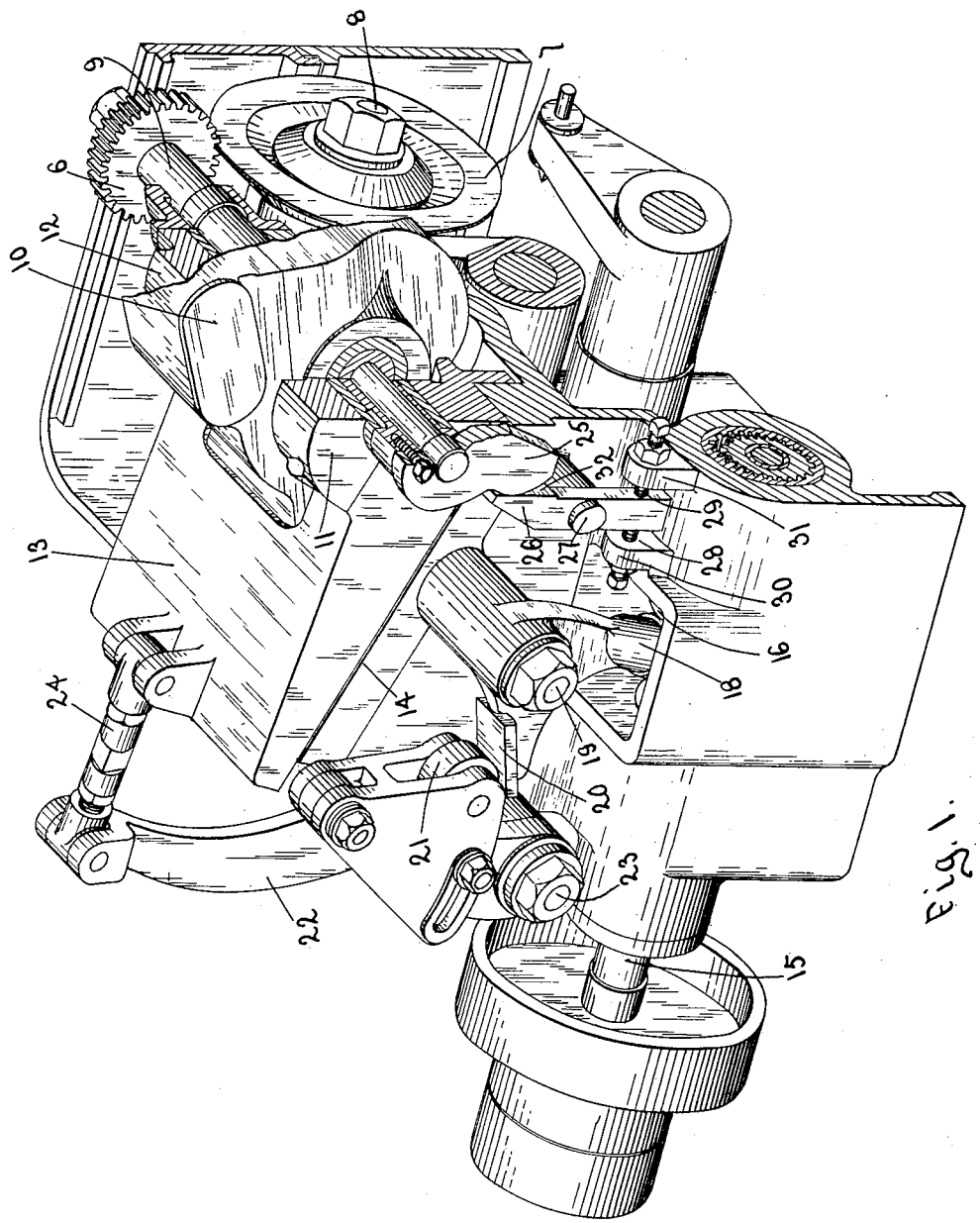
Figure 1 is a perspective view of part of such a gear grinding machine as is referred to above, enough of the machine being illustrated to explain the mode of its action and adjustment in carrying out the cutting phase of the invention.

In Figure 1 the gear to be finished is indicated at 6, and the cutting tool is shown at 7. This preferably is a grinding wheel of disk form mounted on a spindle 8 and made with its active face in a plane perpendicular to the axis of the spindle, the rim of the wheel being sufficiently narrow to enter between teeth of the gear and enable the plane active face to engage the face of the nearest tooth. As the grinding wheel is shown in this drawing, the active face is at the front and is the face which is exposed to view.

The gear is mounted on a work spindle 9, and the latter is mounted in a rolling holder 10 which is mounted oscillatively in bearings 11 and 12 in a carriage 13. The carriage is supported on a guide 14 on the base, on which it is adapted to move back and forth, and it is so moved by the following mechanism. A shaft 15 drives a cam, which in this drawing is nearly concealed by the base, but a part of it is shown at 16. This cam acts upon one arm 18 of a bell crank lever pivoted to a stud 19, and having a second arm 20, which acts on a roll 21 carried adjustably by a lever 22. This lever is pivoted on a fixed stud 23 and is connected with the carriage 13 by a link 24. By means of the cam on shaft 15 an oscillative movement is imparted to the bell crank lever 18–20, and from the latter to the lever 22. The weight of the carriage 13 tends to move the latter in one direction since the guideway 14 is inclined, and thereby maintains contact between the roll 21 and arm 20. A separate weight, or a spring, or other suitable means may be applied to exert force on the carriage in the same direction as that in which the carriage tends to move by its own weight.

Preferably the path in which the carriage moves is inclined to the plane in which the face of the grinding wheel lies, at an angle equal, or approximately so, to the tooth angle of the base rack of the involute system of gears to which the gear being finished belongs. The reciprocating movement of the carriage then transports the gear being ground back and forth across the plane of the grinding wheel. At the same time a rolling movement is given to the gear by means of a cam or former 25 which is connected to the rolling holder 10 and bears against the face of a stationary member 26, which I call an abutment, against which it is held by a weight, or suitable equivalent means, applied to exert force in the proper direction upon the holder. The abutment 26 is pivoted to the frame of the machine on a stud 27, and has a part projecting between adjusting screws 28 and 29 which are held by lugs 30 and 31, respectively, on a fixed part of the machine frame. The face 32 of the abutment, against which the cam or former 25 bears, is preferably plane, and is located in a position where it may be placed, by appropriate adjustment of the screws 28 and 29, in the same plane with the active face of the grinding wheel, or at a desired inclination thereto, or it may be located in a plane parallel to such active face, with the same capacity for adjustment at different inclinations to said parallel plane. The face of the cam or former 25 which bears against the abutment is curved, and it curvature is such that, as it rolls on the face of the abutment, it imparts to the gear 6 the same character of rolling movement with respect to the grinding wheel as occurs when an accurate involute gear rolls in mesh with the conjugate base rack of the same system of gearing.

The grinding machine thus briefly described is of the same type as that disclosed in my prior Patents, No. 1,504,223, dated August 12, 1924, and No. 1,628,584, dated May 10, 1927, to which reference is directed for explanation of construction and operation not necessary to be herein described in order to explain the present invention. It is sufficient for the latter purpose to explain that the cutting step of the present invention is preferably performed by instrumentalities which produce a character of rolling motion between the gear being finished and the cutter such as will generate the desired curve in the faces of the gear teeth. This effect is evidently obtainable if the contacting face of the cam or former is a true involute curve generated to the same base circle as that of the gear, when the contacting face of the abutment is in the same plane with the face of the cutter or parallel thereto. This is true whether the movement of the carriage takes place in a straight line, as here shown, or whether it travels in any other path so directed as to carry the axis of the gear back and forth across the plane of the cutter. When the cam and the abutment are formed and positioned as thus described, the faces of the gear teeth are generated to the same involute curve as the face of the cam.

I have discovered that if the abutment is adjusted so as to incline its contact face more or less from the plane of the cutter, the gear teeth may be generated with different curves, all involutes however. Thus, for instance, if the path of the carriage is at a certain angle with the plane of the face of the cutter, say, an angle of seventy degrees, then the cutter has the same relation to this path as the face of a twenty degree rack tooth with the pitch line of the rack, and if at the same time the face of the abutment is in the same plane with the cutting face, the gear teeth are generated conjugate to the twenty degree rack; making what is called a twenty degree gear. But if the abutment is inclined to one side or another of the cutting face, or of a plane parallel thereto, without any other change being made in the machine, the gear teeth may be generated conjugate to a rack of a larger or smaller face angle. What is actually done is to cut the tooth faces on involute curves of a different base circle than that of the face curve of the cam or former.

It is impossible to determine by inspection of the grinding machine itself or of its adjustable parts, even those which are most delicately adjustable, whether the effects desired in the way of cutting gear teeth are actually obtained; for no matter how delicate the adjustment means may be, or how accurately their movements may be measured, the wearing of the contacting faces of the cam and its abutment introduces an indeterminate error. It is only by inspecting the gear itself that the truth or inaccuracy of its teeth can be determined, and then only by comparing the gear teeth with a correct master or standard form. The present invention provides a new method of determining accurately by inspection of the gear whether or not its teeth are correct, and the manner and extent of their departure from the prescribed standard form.

For carrying out this part of the method I may use an instrument of the sort shown in Figures 2 and 3, with the aid of a device which I call a master form, and have shown in Figures 2 and 4, for testing the accuracy of adjustment of the instrument. Briefly describing the essentials of this instrument, it comprises a base 35 having plane supporting surfaces 36 at the top on which rests a rolling unit including cylinders 37 having the same diameter as the base circle of the gear, a massive balance wheel or disk 38, and an arbor 39 on which the rolling cylinders 37 and disk 38 are fixed, and to which the gear is applied. When this unit is rolled on the surface 36, the gear carried by it is rolled on its base circle.

A long arm 391 which I call a feeler member is pivoted below the supporting surface 36, and its upper end is adapted to extend between two of the downwardly projecting teeth of the gear and is provided with a contact point 40 adapted to bear on the face of a gear tooth. A multiplying lever is pivoted to the base 41 and has a short arm 42, which bears against the side of the feeler member near the contact point, and a long arm 43 which operates an indicating pointer 44 to show with greatly multiplied movement slight movements of the contact point. A spring-pressed plunger 45 supports the unbalanced weight of the long arm 43, while a second spring-pressed plunger 46 holds the feeler member against the short arm 42 of the multiplying lever. For convenience of description the plane of the surface 36 is called the rolling plane. Now if the face of the gear tooth is a perfect involute of the supporting cylinder 37, the travel of the tooth face across the rolling plane as the rolling unit rolls on this plane will coincide with a fixed point in the rolling plane. Hence if the feeler contact point bears on the face of the tooth in the rolling plane, it will remain stationary, without movement to either side, as the gear tooth face travels past it in being rolled, provided said face is a true involute curve. But if the face is not true at any point, the direction and amount of its departures from truth will be shown on a multiplied scale by the indicating pointer 44.

However, if the feeler contact should be at one side or the other of the rolling plane, it will be displaced by a perfect involute tooth face, and therefore the indications then given will have no meaning except in comparison with movements given to the feeler by the curved face which is known to be true. Repeated rubbings of gear teeth on the contact point, no matter how hard the latter may be, gradually wear it away until its point of tangency with the gear tooth is displaced from the rolling plane in an unknown direction by an unknown distance. The master form which I have previously referred to is used as the basis of comparison when this effect occurs, and preferably the manner of its use is to test the position of the feeler contact and show when it is adjusted exactly into the rolling plane, the testing instrument being equipped with means for so adjusting the feeler.

The master form is used in this manner principally for the reasons that thereby a single master form, having true involute tooth curves, may be used as a basis of testing involute gear teeth of all diameters and pitches, and also that by using the instrument when its feeler contact is in the rolling plane, the interpretation of the indications given by the instrument is simplified. The means here shown for effecting such adjustments of the feeler consists in making the pivot of the feeler as a cylindrical sleeve 47 which has an eccentric bearing on a stud 48 projecting from the base, and to which sleeve an arm 49 is attached. The end of this arm is confined between a screw plunger 50 and an oppositely acting spring pressed plunger 51. A nut 52 threaded upon the screw plunger and confined, by abutments on the base, against any other movement than rotation, enables the eccentric bearing sleeve 47 to be turned by minute amounts so as to raise or lower the feeler member.

I have not attempted in this illustration of the testing instrument to do more than show the principles of an instrument for the purpose. A complete disclosure of such a machine is given in my patent granted Nov. 9, 1926, No. 1,606,520.

Coming now to the description of the master or standard tooth form, this may be made as a projection 53 on the end of periphery of a plate 54, which has a hole adapted to receive and fit upon the arbor 39, whereby the master gear may be substituted on the rolling unit in place of the gear, and whereby it may be applied to any similar rolling unit. This projection is formed, preferably as to both opposite faces, but as to only one of them if desired, with curved surfaces 55 which are involute curves of the base circle represented by the broken line 56 and are as true and accurate as possible. This master form is placed on a rolling unit having cylinders of the same radius as the base circle 56 and rolled past the feeler contact in the same way as described with respect to the gear. If the indicating pointer then shows any movement, the feeler member is adjusted until after a repeated rolling travel of the master form, no movement of the pointer takes place, or in other words, the movement of the pointer is a minimum.

While it is conceivable that master forms might be furnished with curves corresponding to all the different gears put out by a shop, at least so far as the base circles of the various gears differ from one another, and in that case a direct comparison could be instituted between a gear having any base circle and the corresponding master form, without necessarily adjusting the feeler member; nevertheless it is just as much a comparison when a single master form is used as a basis for testing the teeth of gears all having different base circles, and the method of comparison includes the step of adjusting the feeler as above described.

The manner of practicing the invention may now be understood. It is preferably practiced in connection with gears the teeth of which have already been roughed out to approximate width and form, but left with enough excess metal on their faces to enable the accurate tooth form to be produced in the final finishing cut. Such a gear then is applied to the grinding machine and a preliminary cut taken on one or more of its teeth; the abutment of the grinding machine having been adjusted as nearly as feasible to the correct position for generating a gear of the predetermined diameter, pitch and tooth angle. These three factors of the gear being known and predetermined, determine the diameter of the base circle.

The gear is then removed from the grinding machine and applied to the rolling unit of the testing instrument, such rolling unit having first been provided with rolling cylinders 37 of the same radius as the base circle of the gear, and the gear is rolled past and in contact with the feeler contact point. Any errors in the tooth form which may be shown by the indicator are noted, and then the abutment of the grinding machine is adjusted to reduce the error, the gear returned to the grinding machine, and the cutting operation continued. A succession of tests may be made of the gear between successive cutting operations if desired, or the cutting operation may be continued to completion after a single test, depending upon how accurately the operator may be able to adjust the abutment after noting an error in the gear tooth as the result of the test, or on how great assurance of accuracy he requires.

The factors which make necessary an adjustment of the abutment of the grinding machine are inaccurate initial setting up of the parts of the machine, wearing away of the face of the abutment, which causes such face to be displaced from the plane of the grinding wheel or a given plane parallel thereto, or from a given angle with such a plane; wearing away of the former; or the need of generating the gear tooth to a different base circle than that determined by the angle between the grinding wheel face and the line of travel of the carriage. The testing step of my method enables it to be determined, in any of the cases indicated, whether or not the abutment is correctly adjusted, and shows both qualitatively and quantitively the adjustment needed to place the abutment in the correct position for the special case.

I have already pointed out, that the showing and description herein of a particular grinding machine is illustrative and without limiting effect. Other types of grinding machines or instruments, having other means for controlling the motions of the work and cutter, and having other provisions for adjusting said controlling means may also be used. For instance, one type of such machine is equipped with tapes which control the rolling movement of the work mounted on a traveling carriage, and in such machines stretching and wearing of the tapes cause inaccuracy. With such machines correction may be made by adjusting the bed on which the carriage travels, or by adjusting the plane of the grinding disk. Other types of grinding machine with other modes of adjustment may also be used. Hence so far as the present invention includes the step of grinding, and the step of adjusting grinding means so as to minimize errors discovered by inspection of the gear teeth, all modes of carrying out these steps are embraced within the protection which I claim.

What I claim and desire to secure by Letters Patent is:

1. The method of standardizing gears to a master form, which consists in grinding the gear teeth to an approximation of the master form, adjusting a testing instrument to show a given indication when applied to said master form, testing the gear by said instrument and comparing the result with such indication, and then adjusting the grinding means to reduce the difference between the gear teeth and the master form.

2. The method of grinding gears with adherence to prescribed standard forms, which consists in effecting a controlled relative generating travel between a gear and a grinding cutter such as will generate curves in the gear teeth approximating the standard form, comparing the generated tooth curve with a master form, and further grinding the gear with such alteration of said generating travel as will reduce such difference as is found to exist between the gear tooth curve and the master form.

3. The method of grinding gears with adherence to prescribed standard forms, which consists in effecting a controlled relative generating travel between a gear and a grinding cutter such as will generate curves in the gear teeth approximating the standard form, rolling a master form, having a surface in an involute curve, upon the base circle of such curve on a plane, with said involute surface in contact with a movable feeler lying approximately in said plane, adjusting such feeler until the displacement given to it by the master form, in rolling, is a minimum, rolling the gear on its base circle on the same plane, with its ground tooth face in contact with the same feeler, noting movements of the feeler then caused by parts of the tooth face which deviate from true involute curvature, and further grinding the tooth face with such change in said relative travel as will cut away in largest measure the parts of the tooth face in which such deviation is the greatest.

4. The method of producing gears with tooth faces which are involute curves of a predetermined base circle, consisting in producing such relative generating travel between the gear and the plane cutting face of a grinding disk, in contact with a face of one of the gear teeth, as will cause generation in such face of an approximation of the required curve, adjusting into a given rolling plane the contact point of a movable feeler, testing the accuracy of adjustment of said feeler by rolling on said plane a master tooth form having a true involute-curved face, said face being then in contact with the feeler contact point and the form being rolled on the base circle of the involute curve, absence of movement of the feeler showing correct location of the contact point in the said rolling plane, rolling the gear about its base circle on the same rolling plane with a ground tooth face in contact with the feeler contact point, noting movement of the feeler caused by errors in said tooth face, and regrinding the gear with such modification of said generating travel as will diminish such errors in the tooth forms.

5. The method of accurately finishing gear teeth which consists in cutting away the face of a gear tooth by compound generating travel between the gear and a cutter, determining the rolling component of such relative travel by guiding contact between two parts, one of which is movable while the other is normally fixed but is adjustable angularly, testing the face of the tooth so cut for accuracy of involute curvature, and, if such test shows inaccuracy, adjusting said angularly adjustable part in a direction and to an extent such as will cause the error to be reduced upon further generative cutting.

6. The method of accurately finishing gear teeth which consists in producing a relative translative movement between a carriage holding the gear and a cutter having an active face traveling in a given plane, at the same time producing a rolling movement of the gear by means of guiding elements in contact with one another, testing the face of a tooth of said gear after being cut, and noting any departure of such face from true involute curvature, then adjusting one of said guiding elements in a manner such as will alter the tooth angle of the gear being cut, and continuing the cutting operation after making such adjustment.

7. The method of accurately finishing involute gears which consists in grinding the face of a tooth of such gear to the approximately correct involute form, then testing the tooth so ground for errors in its involute curvature, and then adjusting the grinding instrumentalities in a manner such as to reduce the error shown by such test to exist in the ground tooth.

8. The method of accurately finishing gear teeth which consists in grinding such teeth by the aid of a former and an abutment which give a rolling movement to the gear, and in which machine the abutment is adjustable so that the inclination of its face may be varied, then removing the gear and testing its ground face for accuracy of involute curvature, then adjusting the angle of the abutment as shown to be necessary by the test, and returning the gear to the grinding machine and continuing the grinding operation.

9. The method of producing accurately finished gears which consists in first grinding the gear by rolling it with relation to a grinding wheel having a plane active face, in the same manner that a gear wheel is rolled in mesh with a conjugate rack, controlling the rolling motion of the gear by a former and an abutment against which the former is adapted to roll, the abutment being adjustable as to the inclination of the face against which the former bears, then removing the gear and rolling it on its base circle on a plane, with the previously ground involute tooth in contact with a feeler contact point which is located and movable in said rolling plane, measuring the direction and amount of movement, if any, given to said feeler point by the tooth face, adjusting the abutment angularly in the direction and to the extent found necessary by said measurements, and further grinding the gear under the control of the abutment as so adjusted.

10. The method of finishing gear teeth accurately to involute form as set forth in claim 9, and distinguished further by the method of accurately adjusting the feeler contact point into the contact plane which consists in applying to the rolling unit a master tooth form, rolling said form in engagement with the feeler contact point and about the base circle of the involute curve of such master tooth, and adjusting the feeler until its contact remains stationary while the curved face wipes across it.

11. In a method of accurately finishing gears, the mode of determining accuracy in the adjustment of the feeler member of the testing instrument, which consists in applying to the rolling unit of such instrument a master tooth form having a face which is an involute curve of the same base circle as that of the gear to be tested, and rolling such face of the master form in contact with the feeler member.

12. In the method of accurately finishing gears, the mode of determining accuracy in the adjustment of the feeler member of the testing instrument, which consists in applying to the rolling unit of such instrument a master tooth form having a face which is an involute curve of the same base circle as that of the gear to be tested, rolling such face of the master form in contact with the feeler member, and adjusting the feeler until the movement imparted to it by the master form is a minimum.

In testimony whereof I have affixed my signature.

EDWIN R. FELLOWS.